US008719352B2

(12) United States Patent
Krasser et al.

(10) Patent No.: US 8,719,352 B2
(45) Date of Patent: May 6, 2014

(54) REPUTATION MANAGEMENT FOR NETWORK CONTENT CLASSIFICATION

(75) Inventors: Sven Krasser, Atlanta, GA (US); Dmitri Alperovitch, Atlanta, GA (US); Yuchun Tang, Johns Creek, GA (US); Yuanchen He, Johns Creek, GA (US); Jonathan Zdziarski, Bedford, NH (US); Mark Gilbert, Alpharetta, GA (US)

(73) Assignee: McAfee, Inc., Santa Clara, CA (US)

( * ) Notice: Subject to any disclaimer, the term of this patent is extended or adjusted under 35 U.S.C. 154(b) by 774 days.

(21) Appl. No.: 12/696,828

(22) Filed: Jan. 29, 2010

(65) Prior Publication Data

US 2011/0191423 A1  Aug. 4, 2011

(51) Int. Cl.
*G06F 15/16* (2006.01)
*G06F 15/173* (2006.01)

(52) U.S. Cl.
USPC ............ 709/206; 709/203; 709/224; 709/248

(58) Field of Classification Search
USPC ........................................................ 709/206
See application file for complete search history.

(56) References Cited

U.S. PATENT DOCUMENTS

| | | | | |
|---|---|---|---|---|
| 6,332,158 | B1 * | 12/2001 | Risley et al. ................... | 709/219 |
| 6,944,167 | B1 * | 9/2005 | McPherson .................... | 370/401 |
| 7,167,844 | B1 * | 1/2007 | Leong et al. ..................... | 705/80 |
| 7,177,929 | B2 * | 2/2007 | Burbeck et al. ............... | 709/224 |
| 7,249,380 | B2 * | 7/2007 | Yang ............................... | 726/25 |
| 7,548,544 | B2 * | 6/2009 | Quinlan et al. ............... | 370/392 |
| 7,600,017 | B2 * | 10/2009 | Holtzman et al. ............ | 709/224 |
| 7,644,151 | B2 * | 1/2010 | Jerrim et al. .................. | 709/224 |
| 7,664,866 | B2 * | 2/2010 | Wakefield ..................... | 709/229 |
| 7,702,795 | B2 * | 4/2010 | Zintel et al. .................. | 709/227 |
| 7,712,136 | B2 * | 5/2010 | Sprosts et al. .................. | 726/24 |
| 7,797,413 | B2 * | 9/2010 | Adelman et al. ............. | 709/223 |
| 7,801,896 | B2 * | 9/2010 | Szabo ........................... | 707/739 |
| 7,836,133 | B2 * | 11/2010 | Quinlan et al. ............... | 709/206 |
| 7,849,142 | B2 * | 12/2010 | Clegg et al. .................. | 709/206 |
| 7,860,755 | B2 * | 12/2010 | Warner ........................ | 705/26.8 |
| 7,870,200 | B2 * | 1/2011 | Slater et al. ................... | 709/206 |
| 7,908,328 | B1 * | 3/2011 | Hulten et al. ................. | 709/206 |
| 7,921,063 | B1 * | 4/2011 | Quinlan .......................... | 706/12 |
| 7,925,516 | B2 * | 4/2011 | McCann et al. ............... | 705/1.1 |
| 7,925,704 | B2 * | 4/2011 | Keller et al. ................. | 709/206 |
| 7,926,108 | B2 * | 4/2011 | Rand et al. ..................... | 726/22 |
| 7,934,253 | B2 * | 4/2011 | Overcash et al. .............. | 726/22 |
| 7,937,468 | B2 * | 5/2011 | Libbey et al. ................ | 709/225 |
| 7,941,490 | B1 * | 5/2011 | Cowings ....................... | 709/206 |

(Continued)

OTHER PUBLICATIONS

Bellovin, Steven. "Using the Domain Name System for System Break-Ins," Proceedings of the Fifth USENIX UNIX Security Symposium, 1995, pp. 1-11.*

(Continued)

*Primary Examiner* — Melvin H Pollack
(74) *Attorney, Agent, or Firm* — Wong Cabello Lutsch Rutherford & Brucculeri, LLP.

(57) ABSTRACT

A system derives a reputation for a plurality of network addresses, the reputation of each network address determined by analyzing a plurality of high-level email features related to one or more emails originating from the network address. The plurality of high-level email features include domain registration analysis, hashed term frequency indexing, persistent communication, address age, correlation analysis, zombie detection, and hash vault matching.

31 Claims, 2 Drawing Sheets

(56) References Cited

U.S. PATENT DOCUMENTS

| | | | |
|---|---|---|---|
| 7,970,845 B2 * | 6/2011 | Yu | 709/206 |
| 7,971,257 B2 * | 6/2011 | Repasi et al. | 726/24 |
| 7,996,475 B2 * | 8/2011 | Drako et al. | 709/206 |
| 8,006,306 B2 * | 8/2011 | Gopalan et al. | 726/24 |
| 8,010,614 B1 * | 8/2011 | Musat et al. | 709/206 |
| 8,015,284 B1 * | 9/2011 | Isenberg et al. | 709/224 |
| 8,015,484 B2 * | 9/2011 | Backer | 715/234 |
| 8,037,144 B2 * | 10/2011 | Lund et al. | 709/206 |
| 8,056,133 B1 * | 11/2011 | Yao et al. | 726/24 |
| 8,069,210 B2 * | 11/2011 | Gillum et al. | 709/206 |
| 8,091,093 B2 * | 1/2012 | Huntsman | 719/318 |
| 8,091,127 B2 * | 1/2012 | Bradicich et al. | 726/22 |
| 8,112,486 B2 * | 2/2012 | Oliver et al. | 709/206 |
| 8,161,152 B2 * | 4/2012 | Ogielski et al. | 709/224 |
| 8,171,524 B2 * | 5/2012 | Micali et al. | 726/2 |
| 8,312,119 B2 * | 11/2012 | Gillum | 709/223 |
| 8,346,880 B2 * | 1/2013 | Lund et al. | 709/206 |
| 8,370,504 B2 * | 2/2013 | Simpson et al. | 709/228 |
| 2005/0114653 A1 * | 5/2005 | Sudia | 713/158 |
| 2005/0132060 A1 * | 6/2005 | Mo et al. | 709/227 |
| 2005/0132069 A1 * | 6/2005 | Shannon et al. | 709/228 |
| 2007/0288247 A1 * | 12/2007 | Mackay | 705/1 |
| 2010/0138535 A1 * | 6/2010 | Jerrim et al. | 709/224 |
| 2011/0016217 A1 * | 1/2011 | Simpson et al. | 709/228 |
| 2011/0191832 A1 * | 8/2011 | Davis et al. | 726/5 |
| 2011/0191847 A1 * | 8/2011 | Davis et al. | 726/22 |
| 2011/0271329 A1 * | 11/2011 | Hulten et al. | 726/4 |

OTHER PUBLICATIONS

Householder, A. et al. "Computer Attack Trends Challenge Internet Security," Computer, vol. 35, Issue 4, Apr. 2002, pp. 5-7.*

Lippman, R. P. et al. "Evaluating Intrusion Detection Systems: The 1998 DARPA Off-Line Intrusion Detection Evaluation," Darpa Information Survivability Conference and Exposition, vol. 2, 2000, pp. 12-26.*

Ramasubramanian, Venugopalan and Sirer, Emin Gun. "The Design and Implementation of a Next Generation Name Service for the Internet," Proceedings of the 2004 Conference on Applications, Technologies, Architectures, and Protocols for Computer Communications (ACM SIGCOMM Computer Communications Review), vol. 34, Issue 4, Oct. 2004, pp. 331-342.*

Rosenbaum, R. "Using the Domain Name System to Store Arbitrary String Attributes," RFC 1464, May 1993, pp. 1-4.*

Arends, R. et al. "DNS Security Introduction and Requirements," RFC 4033, Mar. 2005, pp. 1-21.*

Arends, R. et al. "Resource Records for the DNS Security Extensions," RFC 4034, Mar. 2005, pp. 1-29.*

Atkins, D. and Austein, R. "Threat Analysis of the Domain Name System (DNS)," RFC 3833, Aug. 2004, pp. 1-16.*

Vixie, P. et al. "Dynamic Updates in the Domain Name System (DNS Update)," RFC 2136, Apr. 1997, pp. 1-26.*

Kaufman, C. "Internet Key Exchange (IKEv2) Protocol," RFC 4306, Dec. 2005, pp. 1-99.*

Peterson, J. "Common Profile for Presence (CPP)," RFC 3859, Aug. 2004, pp. 1-15.*

* cited by examiner

# REPUTATION MANAGEMENT FOR NETWORK CONTENT CLASSIFICATION

FIELD OF THE INVENTION

The invention relates generally to security in a computerized system, and more specifically to reputation management for network content classification.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users or criminals to attempt to communicate with other users' computers in a manner that poses a danger to the other users. For example, a hacker may attempt to log in to a corporate computer to steal, delete, or change information. Computer viruses or Trojan horse programs may be distributed to other computers, or unknowingly downloaded or executed by large numbers of computer users. Further, mass spam emails or emails having malicious content may be sent across the network, often from "zombie" computers taken over via Trojans or other malware.

For these and other reasons, many computer systems employ a variety of safeguards designed to protect computer systems against certain threats. Firewalls are designed to restrict the types of communication that can occur over a network, antivirus programs are designed to prevent malicious code from being loaded or executed on a computer system, and malware detection programs are designed to detect remailers, keystroke loggers, and other software that is designed to perform undesired operations such as stealing information from a computer or using the computer for unintended purposes. Similarly, email that can be recognized as spam or as malicious is often quarantined before it reaches a user's inbox, helping reduce the impact of undesirable email on the user.

Many such protective systems use signatures of known threats to detect and control the threat. For example, antivirus software typically uses a large library of signatures comprising code segments or other identifying information to scan storage such as hard drives and to scan executing programs, removing offending code from the computer system before it can cause damage. Email spam programs similarly search for common terms within the email suggesting the email may be spam, and quarantine the message rather than deliver it.

Detection of new threats, such as email designed to avoid spam filter detection or new viruses, remains a challenge. Given that undesirable email and other forms of undesirable network content are constantly being developed, and are often configured to avoid detection, efficient and accurate detection of these threats remains an ongoing challenge.

SUMMARY

Some example embodiments of the invention comprise a system or method for deriving a reputation for a plurality of network addresses, the reputation of each network address determined by analyzing a plurality of high-level email features related to one or more emails originating from the network address. The plurality of high-level email features include in various embodiments one or more of domain registration analysis, hashed term frequency indexing, persistent communication, address age, correlation analysis, zombie detection, and hash vault matching.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Some example embodiments of the invention comprise a system or method for deriving a reputation for a plurality of network addresses, the reputation of each network address determined by analyzing a plurality of high-level email features related to one or more emails originating from the network address. The plurality of high-level email features include in various embodiments one or more of domain registration analysis, hashed term frequency indexing, persistent communication, address age, correlation analysis, zombie detection, and hash vault matching.

Because detection of undesired network content such as spam email using signatures alone is becoming less effective as content producers design programs to avoid detection, other methods are desired to improve detection rates of undesired email or software that performs undesirable functions. One such method involves looking up accumulated reputation data for a particular Internet IP or address, typically using a large amount of raw network data to make a somewhat educated guess as to the character of the Internet entity in question. Various embodiments of the invention transform such aggregate data into data that is useful to make a security determination regarding the Internet entity, improving the responsiveness and accuracy of malware detection systems.

Figure 1:
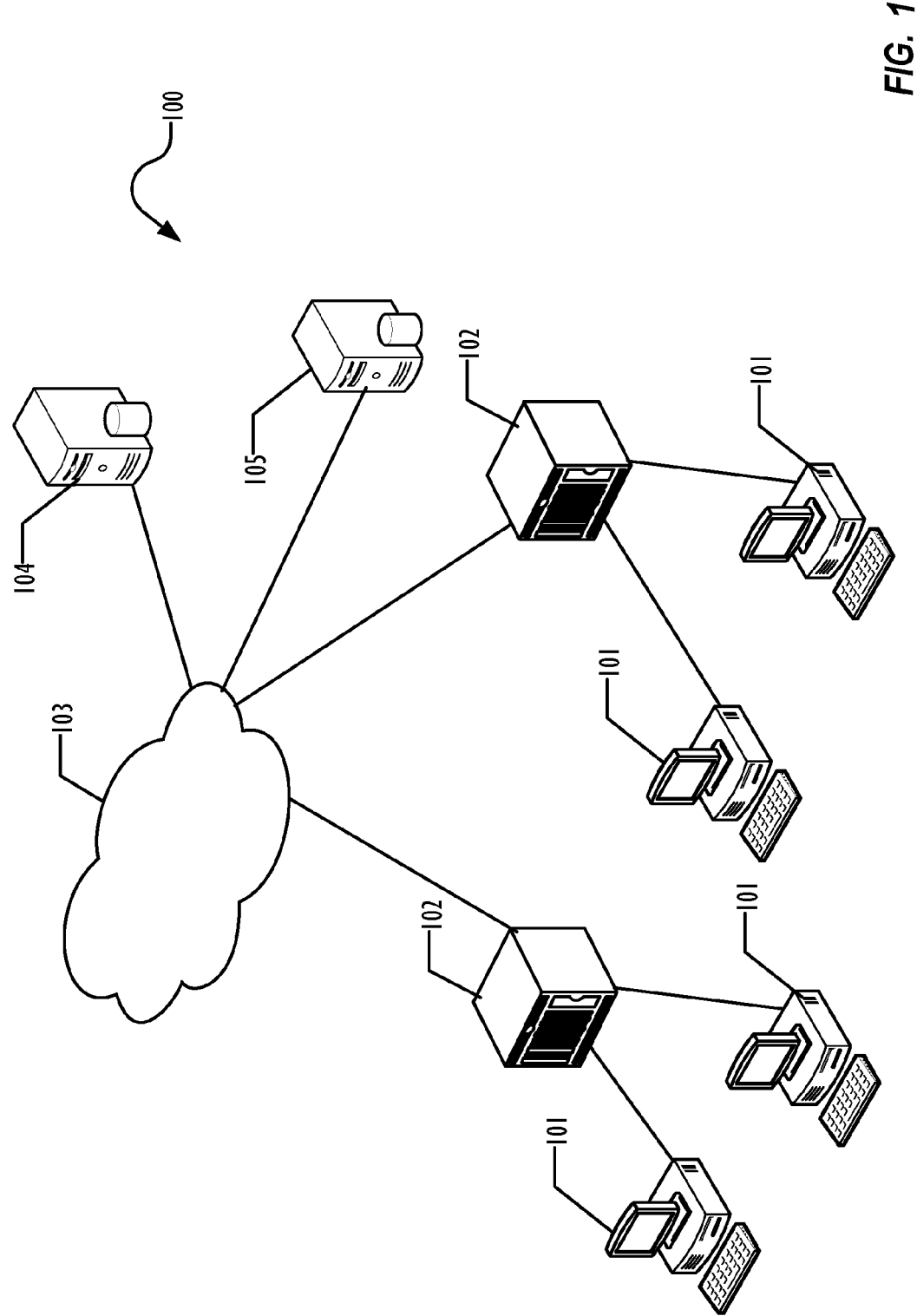
FIG. 1 shows a network environment, consistent with an example embodiment of the invention.

FIG. 1 illustrates a network computing environment, consistent with some example embodiments of the invention. Here, a number of computers 101 such as desktop personal computers are coupled via other computer systems 102 such as gateways, firewalls, servers, or other such systems, to a network 103 such as the Internet. Some embodiments further include one or more security servers 104, such as a TrustedSource™ or other server, and one or more unknown or suspicious computer systems 105 connected to the network.

The TrustedSource™ server 104 in some examples compiles information such as volume, email, web traffic, malware, and reputation information for various entities on the network, using IP address, URL, or another suitable identifier. This information can be collected via monitoring systems placed throughout the network 103, through associated security appliances such as 102 that report traffic information back to the server 104, or through server 104's queries to various IP addresses, URLs, name servers, and the like.

Top level domain server information is used in a more detailed example to perform domain registration analysis, in which the server 104 receives DNS zone information from a number of top-level domain zones. Using this data, the server analyzes each registered domain name with respect to multiple features or characteristics. A Markov model is compiled of known good and bad domain names, and is used to calculate the probability of each new or unknown domain name to make a preliminary determination as to whether the domain appears likely to be malicious based on its name. The Markov model further considers the apparent validity of the names or words used to form the domain name. For example, a "t" followed by a "h" is likely part of a traditional sounding word, whether found in a dictionary or not, while a "t" followed by a "k" is more suggestive of a random string of characters. This exploits that many new bad domain names are random strings, have long strings of numbers, or have other such characteristics in common.

In another example, the server analyzes how many nameservers host a particular domain, and the movement of a domain between nameservers over time. This is achieved by regularly querying nameservers and storing the results in server 104 in some embodiments, or by downloading and recording zone information. Names originating from suspect nameservers, or names registered on a large number of nameservers or on largely suspect nameservers can therefore be considered more likely to be malicious computer systems than names initiated and persistently served from reputable nameservers. Further, useful nameserver information for an unknown domain can be derived from zone information, such as by observing how domains move between nameservers over time, other domains hosted on the same nameserver, and the reputation history of these other domains or the nameserver itself.

Other properties of the domain name, such as whether the domain name is an international domain name, the presence and use of numbers in the domain name, and other such features are also used in determining the trustworthiness of a domain or address. All these features are then classified using a machine learning classifier allowing the system to detect millions of malicious domains at the time of initial registration.

Another method often used to identify potentially malicious domains in some embodiments includes using in-memory token indexing, for example of content hosted on a domain, involving a common text classification technique known as Term Frequency/Inverse document frequency (TFIDF). This system looks at words to see if they are typical text words, and creates various characterizations of a document such as an email message or other network data reflecting the likelihood that the data is standard text and not malicious. In a further example, the document can be classified by type, such as business, banking, pornography, and the like.

Although words in a document can be added to a dictionary and then receive an index value, this limits analysis of the document to a single machine. In this in-memory approach, a hash is generated for each word and is used as the index value representing the word, allowing multiple systems such as 104 or 102 to concurrently index and classify pages in clusters without concurrency issues.

A system can also be characterized based on the type and frequency of communication with other systems, or persistent communication. A server 104 or appliances such as 102 distributed throughout a network can monitor and analyze globally based on queries to the systems which IPs engage in regular communications with stable sender/receiver addresses, which is an indication of good senders. Other information, such as domains that send but do not receive messages, domains that send large quantities of messages but have existed for a very short time, and domains that send the same messages to the same group of people repeatedly can be considered suspect. Furthermore, the same logic can be applied to other types of reputation requests that contain sender/receiver pair, or more general source/destination pairs, such as one machine accessing resources on a server, a user issuing a transaction with a credit card to a server, etc.

Longevity of an identifier such as an IP address is also useful in that a system such as server 104 can exploit the property that older IPs are more likely to be legit. If IPs maintain a regular sending pattern, they receive a positive bias on the system. Periods of inactivity in turn will negatively impact the reputation of the domain, indicating a greater likelihood of malicious intent. Such a "guilty until proven innocent" approach takes advantage of the observation that most new senders are malicious, and considers a new IP potentially malicious absent some other indication that it is valid. The same logic can be applied to other reputation requests in further embodiments, such as users accessing resources or transactional data (such as credit card transactions).

The Trusted Source server can also make a guess as to the malicious intent of a domain by exploiting the correlation between IP addresses sending messages with similar metadata (from and to addresses, EHLO strings used in ESMTP communication, etc.). Spam mailing software often does not change the EHLO string (or HELO string) of the software sending the spam email, and often reuse the same email address lists or lists that have substantial commonality. Moreover, many times a specific set of spoofed from-addresses or from-domains is used (for example, spoofed@example.com). Identifying different senders using the same set of messaging data allows grouping IPs under the control of the same spammer or software, or who are using the same email list, and characterizing the group as malicious. This can be accomplished by using the set of metadata observed for an IP as a sparse feature vector, which can also be concurrently generated using the in-memory indexing outlined above. Other data, such as a hash of the subject line, or flags for addresses that are hosted by a number of popular email providers such as Yahoo, Hotmail, and Gmail, and other such characteristics are also considered in further embodiments.

Correlation analysis between mailing lists and common emails can further be used to associate an unknown domain with a domain that has built a good reputation, such as by recognizing that a web merchant is using the same mailing list and sending a recognized email to customers from a new domain, adding to the reputation of the new domain.

Many new IPs sending network traffic turn out to be "zombies", or computer systems that have been compromised by a hacker or a virus. Zombie computers are often used to perform malicious tasks, such as sending spam messages under remote direction. For each new sending IP address found on the network, a server such as 104 keeps extra statistics in real time, such as the number of repeat emails, the number of queries to the system for such a new IP, and the number of sources of these queries. New domains that send the same email to a very large number of addresses are likely suspects for being zombie computers. Tracking the number of messages and the number of receivers in a given time window also facilitate using a heuristic approach for the system to lower the reputation of senders that exceed certain thresholds. Once IPs have a good track record (identifier longevity, correlation analysis, or other such machine learning techniques), the system stops tracking IPs this way.

A "hash vault" of message data seen on the network is also maintained on a system such as a reputation server 104, in which content fingerprints seen in emails are tracked in real-time and hash values from known good or bad senders are stored and flagged accordingly. A least-recently used (LRU) approach is used to make room for new hash values, enabling tracking of the most current known good and known bad messages that are commonly seen in the network. For example, an Amazon.com sale email may be seen millions of times but is known good as it is from a trusted sender, while a spam email from known bad senders can be recognized even if sent from new zombie computer domains by recognizing the email's hash value and associated "bad" flag.

The hash value is in some embodiments not formed from the entire email, but comprises several hashes of different parts of a message, such as 12 hashes of different message segments. Obfuscation of a message by adding or altering content in a portion of a message may result in altering one or more of the hash values, but several other hash values will likely remain the same and enable detection of the message.

This hash vault system can be used not only to make determinations regarding the reputation of a particular email sender, but can also be used or queried by a mail gateway or appliance to identify and block known bad emails.

These techniques enable building a reputation intelligence system that allows a domain reputation service such as may be hosted on a server 104 to react quickly on new threats based on various types of low-informative data sources.

Figure 2:
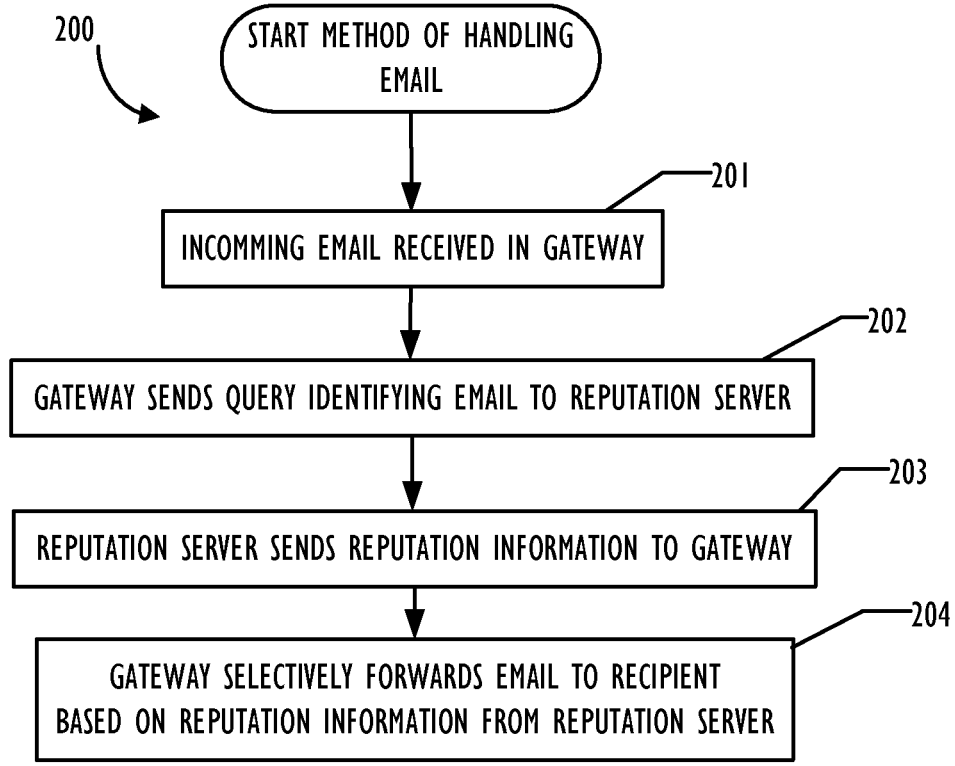
FIG. 2 shows a flowchart of a method of handling email based on the reputation of a sending domain, consistent with an example embodiment of the invention.

FIG. 2 shows an example method of using a reputation intelligence system to manage email, consistent with an example embodiment of the invention. An email is sent from an unknown domain, such as computer system 105 in FIG. 1. The mail is sent via the Internet 103 to an end user 101, where the end user's computer is protected by a gateway device 102 that filters email for spam, malware, and other threats. The email message travels from sender 105 through the Internet to gateway device 102 as shown at 201 of FIG. 2, where the email is compared against locally cached reputation information gathered from a reputation server 104.

Because the sender is unknown to the gateway, the gateway sends a query including various characteristics of the email message to the reputation server at 202. The reputation server uses one or more of the methods described herein to derive a reputation score or other indication for the domain, and sends a response back to the gateway 102 as shown at 203. The reputation server in a further example records characteristic information regarding the email for use in refining the domain's reputation, as discussed above.

The gateway device 102 then uses the provided sender reputation information to make a determination as to how to handle the email message. In various embodiments, the email is flagged as potentially harmful but forwarded, is quarantined, is forwarded to the end user, or is handled in another way based on the reputation score of the sender. The gateway 102 is in some further embodiments configurable, so that certain domains can be automatically trusted or untrusted, or so that various reputation classifications or scores result in different email handling.

This example illustrates how a gateway appliance incorporating email screening can both benefit from the aggregated reputation data provided by a reputation server 104, and can provide information regarding the emails it receives to the reputation server so that the server is able to derive a more accurate reputation score regarding the sending domain. Similar systems can be used to track transactions other than sent emails, including but not limited to credit card transactions, consumer transactions, and file transactions. For example, a network address observed to have a significant transaction volume in illegal file sharing can be marked as suspect, and illegal programs or media hashed and flagged for future reference in identifying other illegal file sharing domains.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A computer network device, comprising:
one or more processing units; and
a reputation server module executing on the one or more processing units, the reputation server module operable to derive a reputation for a plurality of network identifiers, the reputation of each network identifier determined by analyzing which nameservers contain information to resolve a particular domain name, changes in which nameservers contain information to resolve the particular domain name over a time duration, and one or more of a plurality of high-level transaction features related to one or more transactions originating from the each network identifier, wherein the nameservers are used to resolve domain names to internet protocol (IP) addresses corresponding to a server for the domain name.

2. The computer network device of claim 1, wherein the each network identifier comprises at least one of a domain name, an IP (Internet Protocol) address, and a URL (Uniform Resource Locator).

3. The computer network device of claim 1, wherein the plurality of high-level transaction features comprise one or more of hashed term frequency indexing, persistent communication, address age, correlation analysis, zombie detection, and hash vault matching.

4. The computer network device of claim 1, where the transaction features comprise hashes of content from one or more senders associated with network identifiers, the hashes stored associated with the reputation of the associated network identifier.

5. The computer network device of claim 1, where the transaction features comprise source and destination pairs that are analyzed for persistent communication patterns.

6. The computer network device of claim 1, where the transaction features comprise sparse data retrieved by hash-based indexing of content information.

7. The computer network device of claim 1, where the transaction features comprise domain names that are analyzed using statistical language models and properties derived from the nameservers containing resolution information for these domains.

8. The computer network device of claim 1, where transaction features are tracked in real-time for unknown or suspicious network identifiers that are then subjected to further analysis to determine whether to allow or deny a transaction.

9. The computer network device of claim 1, the transaction comprising email and the computer network device further operable to receive email information from a plurality of network devices, and to derive network identifier reputation data from the received email information.

10. The computer network device of claim 1, the computer network device further operable to receive email information from a client device and to return reputation data regarding an email sender's network identifier to the client.

11. The computer network device of claim 1, wherein the network device is further operable to send reputation information regarding the each network identifier to at least one of an end user and a gateway device, such that the end user or gateway device can use the reputation information to allow or disallow network traffic other than email between an end user and the each network identifier.

12. The computer network device of claim 1, wherein the transaction comprises at least one of an email transaction, a credit card transaction, a consumer transaction, and a file transaction.

13. A non-transitory computer storage device comprising instructions stored thereon to cause one or more processing devices to:
determine a reputation for a plurality of network identifiers, the reputation of each network identifier determined by analyzing which nameservers contain information to resolve a particular domain name, changes in which nameservers contain information to resolve the particular domain name over a time duration, and one or more of a plurality of high-level features related to one or more transactions originating from the each network identifier, wherein the nameservers are used to resolve domain names to internet protocol (IP) addresses corresponding to a server for the domain name.

14. The non-transitory computer storage device of claim 13, wherein the each network identifier comprises at least one of a domain name, an IP (Internet Protocol) address, and a URL (Uniform Resource Locator).

15. The non-transitory computer storage device of claim 13, wherein the plurality of high-level features comprise one or more of domain registration analysis, hashed term frequency indexing, persistent communication, address age, correlation analysis, zombie detection, and hash vault matching.

16. The non-transitory computer storage device of claim 13, wherein the features related to one or more transactions comprise hashes of content from one or more senders associated with network identifiers, the hashes stored associated with the reputation of the each network identifier.

17. The non-transitory computer storage device of claim 13, wherein the features related to one or more transactions comprise source and destination pairs that are analyzed for persistent communication patterns.

18. The non-transitory computer storage device of claim 13, wherein the features related to one or more transactions comprise sparse data retrieved by hash-based indexing of content information.

19. The non-transitory computer storage device of claim 13, further comprising instructions to cause the one or more processing devices to analyze using statistical language models and properties derived from the nameservers containing resolution information for domain names associated with the one or more transactions originating from the network identifier.

20. The non-transitory computer storage device of claim 13, further comprising instructions to cause the one or more processing devices to track the features related to one or more transactions in real-time for unknown or suspicious network identifiers that are then subjected to further analysis to determine whether to allow or deny a transaction.

21. The non-transitory computer storage device of claim 13, further comprising instruction to cause one or more processors to receive email information from a plurality of network devices, and derive network identifier reputation data from the received email information.

22. The non-transitory computer storage device of claim 13, further comprising instructions to cause one or more processors to receive email information from a client device and reply to the client with reputation data regarding a network identifier of a sender of the email.

23. The non-transitory computer storage device of claim 13, further comprising instructions to cause one or more processors to send reputation information regarding the each network identifier to at least one of an end user and a gateway device, such that the end user or gateway device can use the reputation information to allow or disallow network traffic other than email between an end user and the each network identifier.

24. The non-transitory computer storage device of claim 13, wherein a transaction selected from the one or more transactions comprises at least one of an email transaction, a credit card transaction, a consumer transaction, and a file transaction.

25. An email handling system, comprising:
one or more processing units; and
an email handling module executing on the one or more processing units, the email handling module operable to receive an email, request reputation information regarding the email's network identifier from a reputation server, and selectively forward the email based on reputation information regarding the sender received from the reputation server;
the reputation information for the email's network identifier determined by analyzing which nameservers contain information to resolve a particular domain name, changes in which nameservers contain information to resolve the particular domain name over a time duration, and one or more of a plurality of high-level email features related to one or more emails originating from the email's network identifier, wherein the nameservers are used to resolve domain names to internet protocol (IP) addresses corresponding to a server for the domain name.

26. The email handling system of claim 25, wherein the email handling module is further operable to send information regarding received emails to the reputation server, such that the reputation server is operable to derive the network identifier reputation information from the received email information.

27. The email handling system of claim 25, wherein the email's network identifier comprises at least one of a domain name, an IP (Internet Protocol) address, and a URL (Uniform Resource Locator).

28. The email handling system of claim 25, wherein the plurality of high-level email features comprise one or more of domain registration analysis, hashed term frequency indexing, persistent communication, address age, correlation analysis, zombie detection, and hash vault matching.

29. The email handling system of claim 25, further comprising at least one additional network traffic handling module executing on the one or more processing units and operable to use reputation information regarding the email's network identifier to allow or disallow network traffic other than email between an end user and the email's network identifier.

30. The computer network device of claim 1, wherein analysis of which nameservers contain information to resolve a particular domain name further comprises deriving nameserver information for an unknown domain from zone information including identification of other domains having resolution information available on a common nameserver and a reputation history of the other domains.

31. The computer network device of claim 30, wherein analysis of which nameservers contain information to resolve a particular domain name further comprises utilizing the reputation history of the common nameserver.

* * * * *

UNITED STATES PATENT AND TRADEMARK OFFICE
CERTIFICATE OF CORRECTION

PATENT NO.       : 8,719,352 B2
APPLICATION NO.  : 12/696828
DATED            : May 6, 2014
INVENTOR(S)      : Sven Krasser et al.

It is certified that error appears in the above-identified patent and that said Letters Patent is hereby corrected as shown below:

In the Drawings:

On sheet 2 of 2, in Figure 2, Reference Numeral 201, line 1, delete "INCOMMING" and insert --INCOMING--, therefor.

In the Claims:

In column 9, line 11, in claim 28, delete "handing" and insert --handling--, therefor.

Signed and Sealed this
Fifth Day of August, 2014

Michelle K. Lee
*Deputy Director of the United States Patent and Trademark Office*